United States Patent [19]
Yasuda et al.

[11] Patent Number: 5,511,206
[45] Date of Patent: Apr. 23, 1996

[54] MICROPROCESSOR BASED COMPUTER WITH VIRTUAL MEMORY SPACE IN OVERWRITABLE MEMORY

[75] Inventors: Hiroyuki Yasuda, Tokyo; Yoshiaki Sawada; Hirotoshi Maegawa, both of Kanagawa, all of Japan

[73] Assignee: Sony Corporation, Tokyo, Japan

[21] Appl. No.: 202,696

[22] Filed: Feb. 25, 1994

Related U.S. Application Data

[63] Continuation of Ser. No. 643,130, Jan. 18, 1991, abandoned.

[30] Foreign Application Priority Data

Jan. 14, 1990 [JP] Japan ........................................ 2-14062
Jan. 14, 1990 [JP] Japan ........................................ 2-14063

[51] Int. Cl.⁶ .................................................... G06F 12/00
[52] U.S. Cl. ...................... 395/775; 395/413; 364/DIG. 1
[58] Field of Search ................................... 395/400, 425, 395/775

[56] References Cited

U.S. PATENT DOCUMENTS

| | | |
|---|---|---|
| 3,800,291 | 3/1974 | Cocke et al. . |
| 4,145,745 | 3/1979 | De Bijl et al. ........................... 395/400 |
| 4,181,935 | 1/1980 | Feeser et al. . |
| 4,276,594 | 6/1981 | Morley . |
| 4,597,041 | 6/1986 | Guyer et al. . |
| 4,747,044 | 5/1988 | Schmidt et al. . |
| 4,761,733 | 8/1988 | McCrocklin et al. . |

OTHER PUBLICATIONS

IBM Technical Disclosure Bulletin, vol. 29, No. 12, May 1987, pp. 5334–5337 (IBM).

Primary Examiner—Rebecca L. Rudolph
Attorney, Agent, or Firm—Jay H. Maioli

[57] ABSTRACT

A microcode controlled processor having an overwritable memory device for microcode storage includes a setting device for setting a virtual memory space and a conversion table device showing the relationship between the address information of the virtual memory space designated by the setting device and the address in a real memory space inclusive of the memory device. A predetermined address in the virtual memory space is designated to read out data and the contents of the conversion table device may be modified. In this manner, a large size program or a plurality of programs can be executed immediately without the size of the executable program being limited by the size of the real memory space.

3 Claims, 8 Drawing Sheets

MICROPROCESSOR BASED COMPUTER WITH VIRTUAL MEMORY SPACE IN OVERWRITABLE MEMORY

This is a continuation of application Ser. No. 07/643,130 filed Jan. 18, 1991 abandoned.

BACKGROUND OF THE INVENTION

1. Field of the Invention

This invention relates to a microprogram controlled processor in which an overwritable memory having stored micro-code is provided within the processor.

2. Prior Art

In a microprogram controlled processor a control memory 1 having stored micro-code is accommodated inside the processor 2, as shown in FIG. 1. The processor 2 interprets and executes the user program that has been loaded into an external memory 3 in accordance with the micro-code program stored in the control memory 1.

The control memory typically included in the processor is usually of the read-only kind containing preprogrammed micro-code and is typically built into the processor originally.

There is also known a method with a view to high-speed execution of the user program in which the control memory included in the processor is adapted to be read out or written into externally, so that the user program can be directly loaded into the control memory for execution without requiring the external memory.

Meanwhile, in implementing a calculation model, such as a function-type model, an object-oriented model, or some other higher level calculation tool, on such a microprogram controlled processor, an execution model made up of executable units forming the program in a particular language or a so-called framework is required.

The architecture of the present-day electronic computer is the so-called von Neumann architecture. That is, underlying the present-day computer architecture are, the data, storage locations for the data, the processor, and the data processing taking place in the processor. For realizing the execution model on such architecture, not only must the processing indicated on the execution model made up of the executable units forming the program be performed by the processor but also the memory supervision or device supervision must be handled by the processor.

While the execution model is determined by the particular calculations to be performed, the system description of, for example, memory supervision, device supervision, library, scheduler, file system or input/output required for implementing the execution model is determined by the particular hardware architecture, as represented for example in FIG. 2. This system description includes processing that cannot be seen directly from the execution model, such as secondary memory supervisions supervision of the calculation process, or allocation of the processor or CPU to the various processes. The result is that compatibility between the execution model and the hardware architecture has been improved in general.

For example, assuming in the system shown in FIG. 1 that a data base A and a data base B are stored in the outside memory 3, and that it is to be determined whether the data base A and the data base B comprise the same data base, the processor 2 sequentially reads and compares the two data bases A and B, and at the same time controls or supervises the memory, main storage device or secondary storage device, in order to render a judgement on whether the data base A is the same as the data base B.

With such architecture, because the system description based on the hardware architecture is not necessarily concise, the actual system operation cannot be easily predicted when implementing the execution model, or when making a system description, or when programming the execution model. The result is that an unexpected hindrance is apt to be encountered, for example, at the time of memory accessing, because other tasks are being performed by the processor and memory access is not immediately available.

Although the use of dedicated machines or functional memories may be envisaged to improve the compatibility between the execution model and the system architecture, a method based on framing that will give fundamentals for calculation on a large number of execution models would be desirable for realizing a universal architecture.

Meanwhile, with a microprogram controlled processor a control memory that permits reading and writing from outside may be included in the processor to speed up execution of the user program. Nevertheless, a large sized program cannot be executed immediately because the necessarily larger storage capacity of the control memory cannot be realized. Thus, when executing a large size program or executing a plurality of programs time-divisionally it becomes necessary to perform external program switching, the result of which is that the execution efficiency may be drastically lowered.

OBJECT AND SUMMARY OF THE INVENTION

It is therefore an object of the present invention to provide a microprocessor controlled processor whereby the user program may be executed at an elevated speed and the execution efficiency may be improved.

It is another object of the present invention to provide an information processing apparatus, whereby the compatibility between the execution model represented by the executable units making up a program and the hardware architecture may be improved. In addition, a more abstract hardware architecture than the conventional architecture may be obtained, so that a program which is more efficient and more conscious of the computer behavior may be formulated in implementing the execution model or the system description of the execution model.

With the processor of the present invention, the relationship between the address in the real memory space, inclusive of an overwritable memory with the stored microcode, and the address information of a virtual memory space designated by setting means is indicated by a conversion table means for virtualizing the real memory space, inclusive of the overwritable memory means with the stored microcode, and the program represented by the microcode arranged in the virtual address space is executed.

With the information processing apparatus of the present invention, the basic elements of the calculations representing an execution model are thought of as resources and evaluation of the hardware architecture and the calculations for the execution model are implemented as an evaluation of those resources.

DESCRIPTION OF THE PREFERRED EMBODIMENT

Figure 1:
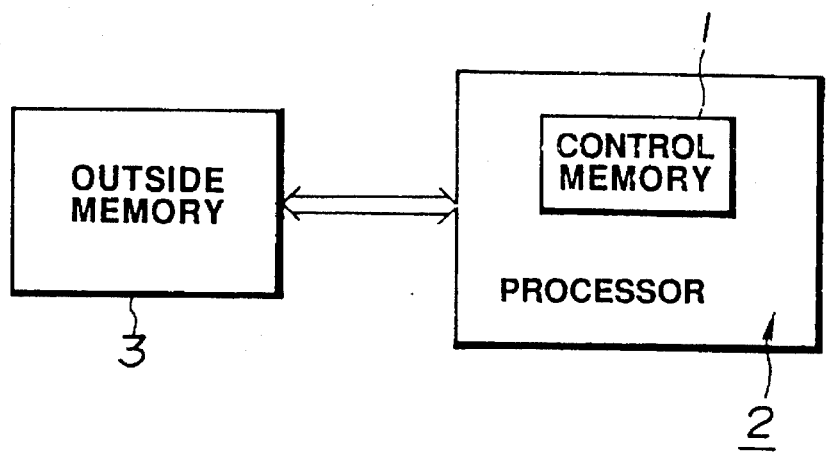
FIG. 1 is a block diagram showing a basic structure of a conventional processor.
Figure 2:
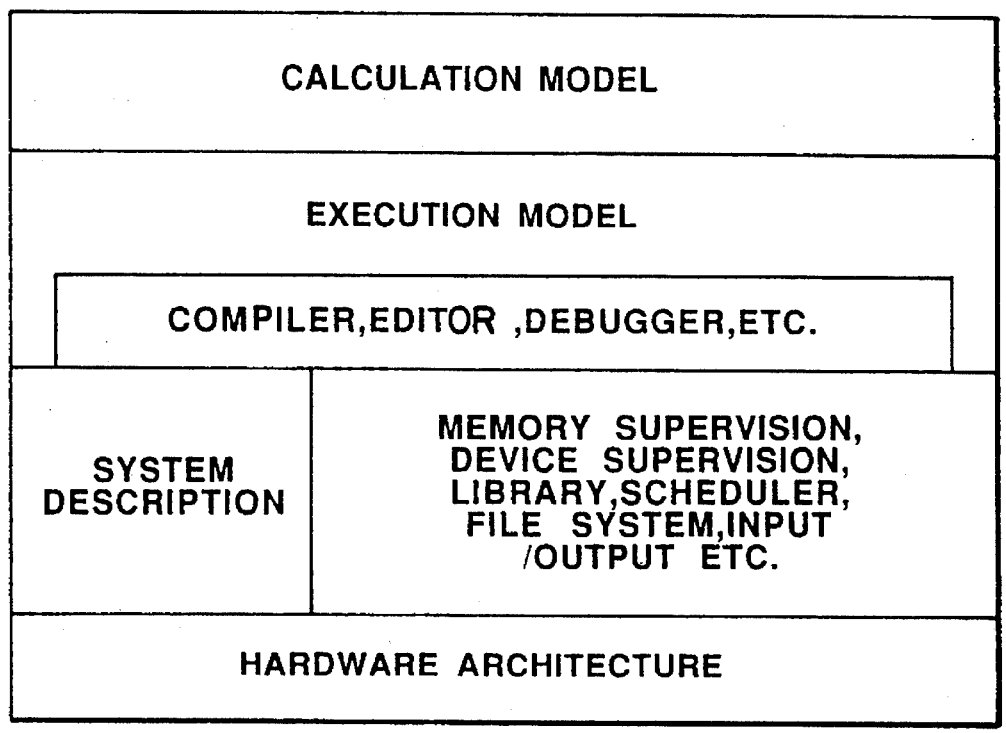
FIG. 2 represents a system architecture of a conventional information processing apparatus.

By referring to the drawings, an illustrative embodiment of the processor according to the present invention will be explained in detail.

Figure 3:
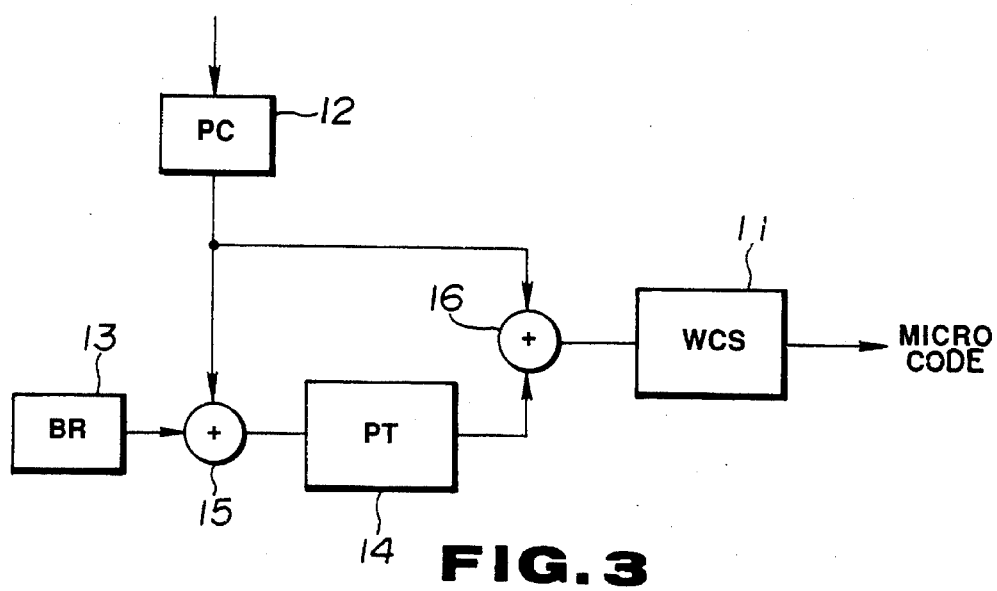
FIG. 3 is a block diagram showing the essential construction of a processor according to the present invention.

Referring first to FIG. 3, the processor according to the present invention is a microprogram controlled system of the type in which a rewritable or overwritable control memory 11 accommodating a micro-code therein is provided within the processor. The addresses, that is, the physical addresses, of the control memory 11 are generated from the virtual address information produced by a program counter 12 by means of a page register 13, a page table 14 and adders 15, 16, in a manner which will be explained subsequently.

Figure 4:
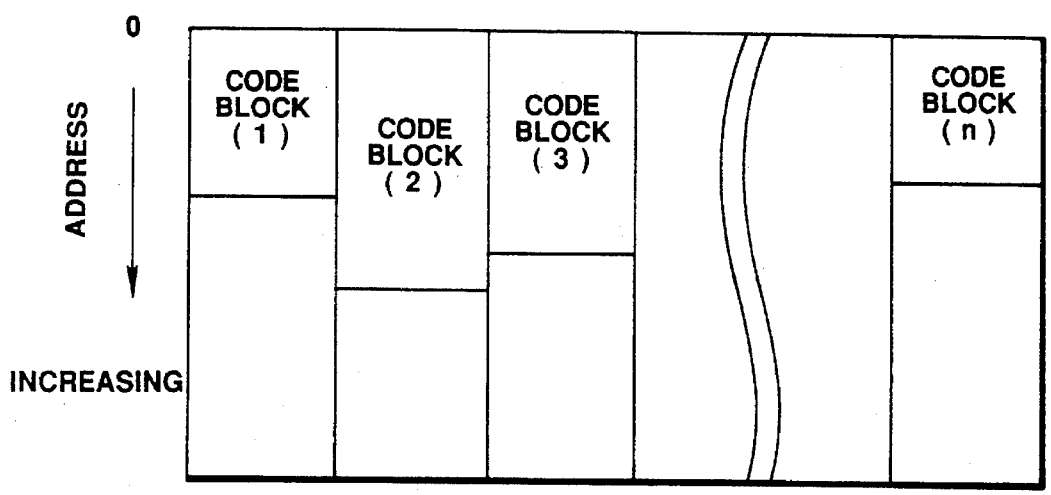
FIG. 4 represents the contents of a virtual address space in the processor shown in FIG. 3.

With the present embodiment, a group of codes for performing a set of processing operations is termed a code block and a virtual address space is allocated to each code block. As shown in FIG. 4, each code block has a common zero-address and a sufficiently large virtual address space extending therefrom.

The program counter 12 generates a 17-bit virtual address for referring to the micro-code stored in the control memory 11.

Figure 5:
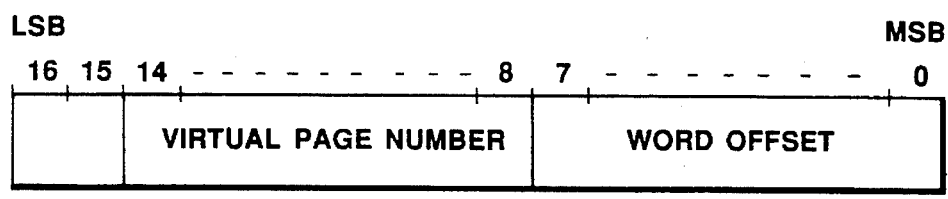
FIG. 5 represents virtual address information generated by the program counter in the processor showing in FIG. 3.
Figure 6:
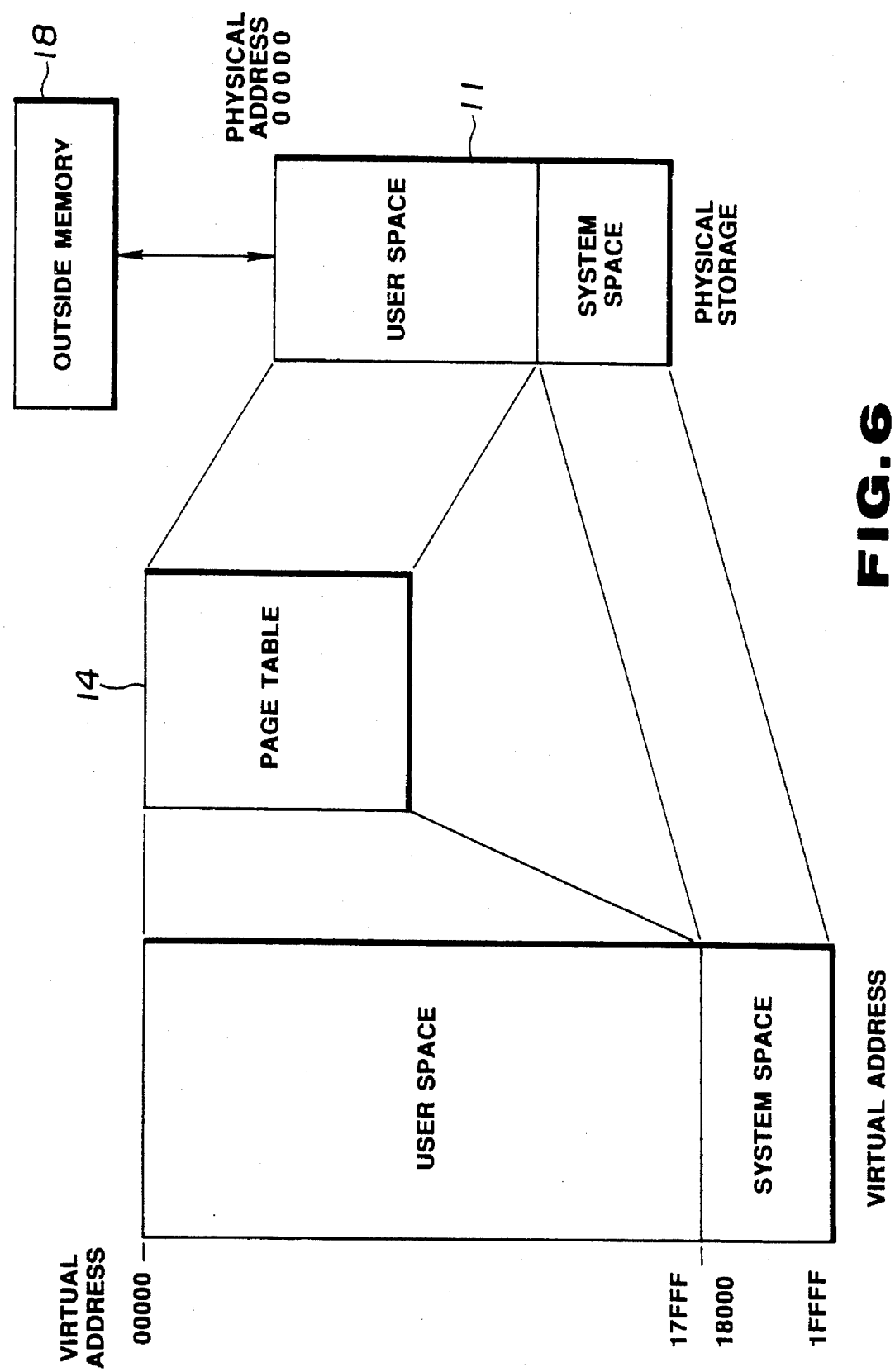
FIG. 6 shows the relationship between the physical address space and the virtual address space in the processor shown in FIG. 3.
Figure 7:
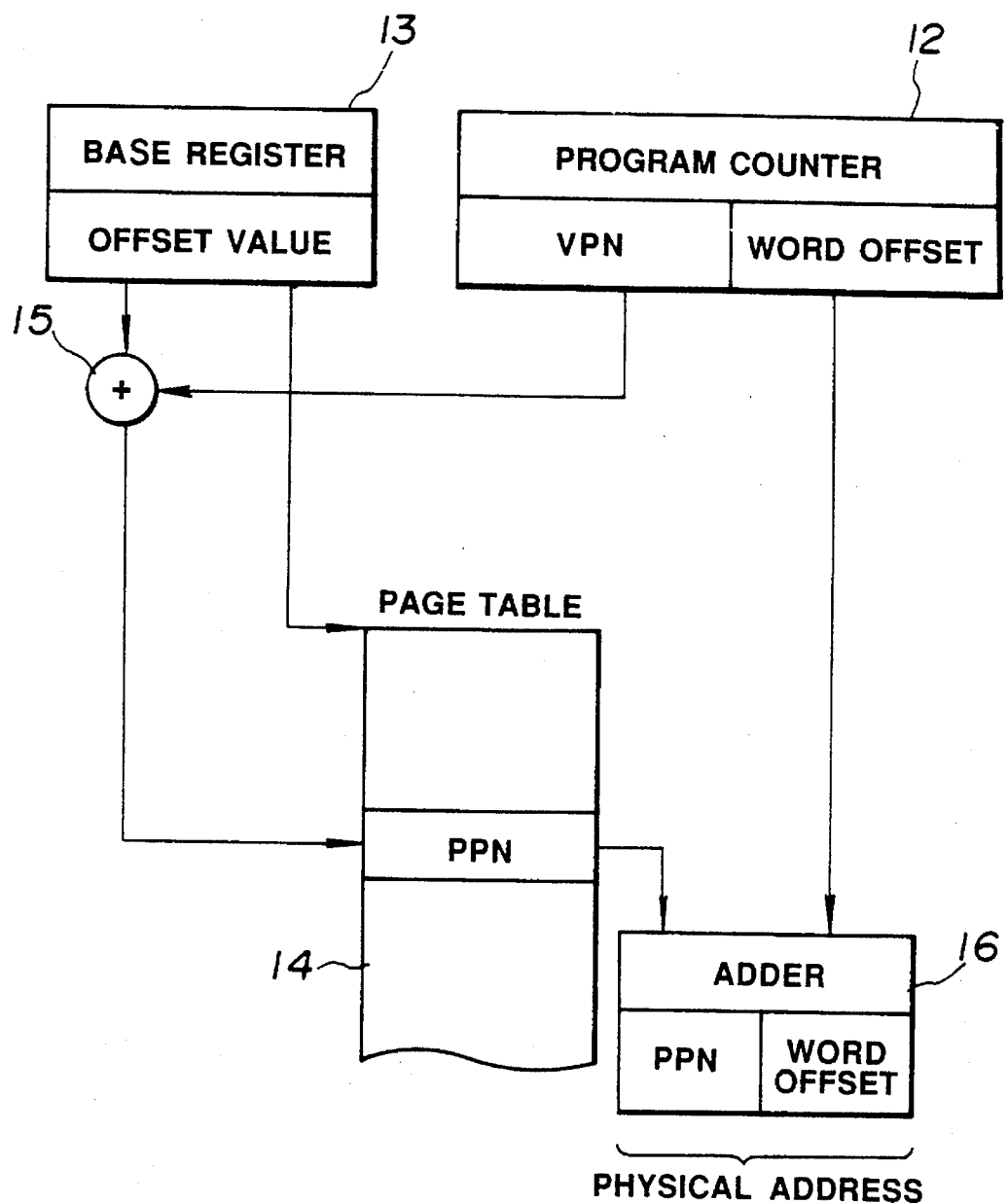
FIG. 7 is a diagrammatic view illustrating address conversion between the virtual address and the physical address in the processor shown in FIG. 3.

The 17-bit virtual address generated by program counter 12 is shown in FIG. 5 consisting of upper seven bits (14th to 8th bits) allocated to a virtual page number (VPN) for each of 256-word pages dividing the virtual address space, and lower eight (7th to 0th bits) bits allocated to word offsets within each page. Referring to FIG. 6, the address space with upper two bits (16th and 15th bits) being "1, 1" is the system space, and the remaining address space is the user space.

The base register 13 is a register for setting a physical base address (PBA) of the page table entry of the user space which is currently in use. The offset value BR with respect to the page table entry in which the data of the block of the code which is being executed is entered into the base register.

The page table 14 is a conversion table for conversion from the virtual addresses to the physical addresses. The physical page number (PPN) of the control memory 11 is entered as a page table entry into this conversion table, and this page table entry is used only for address conversion of the user space. The physical page number PPN is the page number of the physical address space and takes on values from 0 to 511.

With the present embodiment, the address of the page table 14 is represented by the sum at an adder 15 of the virtual page number VPN given by the upper nine bits of the virtual address information generated by the program counter 12 and the offset value BR of the page table entry supplied by the page register 13, or (BR+VPN). The physical page number PPN read out from the page table 14, which is the page table entry stored in the storage location of the page table 14 designated by the address value (BR+VPN) obtained as the output of the adder 15, is added by an adder 16 to the word offset represented by the lower eight bits of the virtual address information generated by the program counter 12, for generating the physical address.

Meanwhile, a page table entry with the physical page number PPN equal to zero means that the corresponding virtual address space is not mapped in the physical page. When the area is accessed, a page fault is produced, and the necessary code block is loaded from an outside backup memory 18, shown in FIG. 6, into the control memory 11. Both the control memory 11 and the page table 14 are the kind of memories into which data can be overwritten from outside. The processor informs the outside of the operating state of these memories by interrupt or the like.

With the processor of the present embodiment, the address space of the control memory 11 is virtualized and the microcode describing the desired user program is stored virtually and executed. With the present processor, since the address space is seen from the processor to have been enlarged, the large size programs that it has been difficult to execute with the conventional microprogram controlled processor can now be executed easily. By virtualizing the address space of the control memory 11, the program can be located as desired without being restricted by the physical address space. Therefore, when plural programs are executed in a time-division fashion, these programs can be stored virtually and switched without outside accessing, thereby improving the execution efficiency.

Meanwhile, when a virtual space is allocated to the software defined by the microcode in its entirety, in which the magnitude and the number of the contents are changed dynamically, the virtual address space that had been continuous becomes discontinuous after time t, thereby complicating the supervision of the virtual address space, while the page table for supervising the virtual address space is increased to lower the utilization efficiency of the virtual address space. This inconvenience may be avoided with the present embodiment in which the virtual address space is not allocated in its entirety but is allocated to each code block as a unit.

With the above described processor of the present invention, since the address space as viewed from the processor is effectively enlarged by virtualizing the address space of the control memory, a large-size program that had been difficult to execute with the conventional microprogram controlled processor can be executed easily.

Since the program is allocated in the virtual address space, it can be allocated with a degree of freedom. Therefore, in an environment in which various programs are executed in a time-division manner program switching can be performed without being limited by the physical address size. In this manner, accessing to the outside may be reduced for improving the execution efficiency.

Figure 8:
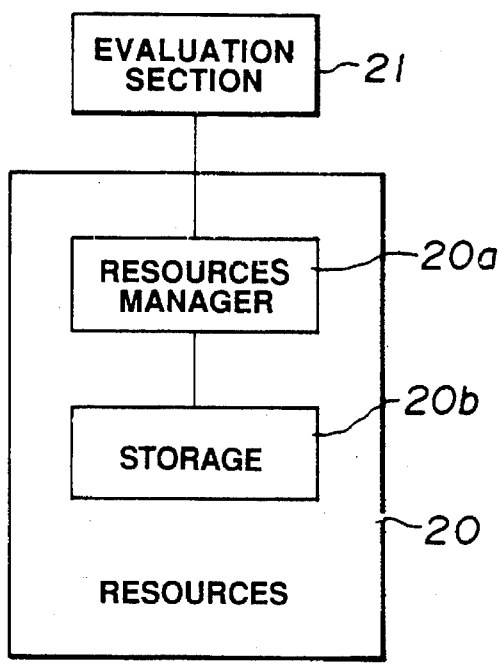
FIG. 8 shows the basic structure of an information processing apparatus according to the present invention.
Figure 9:
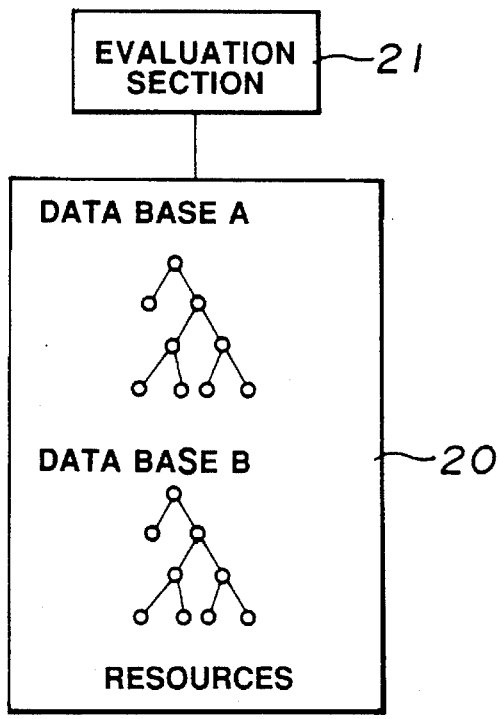
FIG. 9 is a diagrammatic view illustrating the operation of the information processing apparatus shown in FIG. 8.

An embodiment of an information processing apparatus, constructed by using the above described microprogram system processor is explained by referring to the drawings. FIG. 8 shows the basic structure of the information processing apparatus.

In this figure, the information processing apparatus is constituted by a resource manager 20a, a storage unit 20b, and an evaluation unit 21.

The resources manager 20a is a controlling and supervising unit for implementing the resource holding unit 20 with the use of devices, such as a conventional computer memory or secondary storage unit, or an interface. Resources as used herein means data and calculation units of the calculation model, such as a function or object oriented model, or an execution model for implementing a higher level calculation tool on an electronic computer, wherein the calculation units are represented by memory supervision, device supervision, process supervision, task supervision, or communication functions. Thus, the resource holding unit 20 is constituted by the storage 20b as the data storage location and the resource manager 20a, which is the communication mechanism or the data supervising mechanism.

The evaluation section 21 executes evaluation of the resource holding unit 20 and evaluation as used herein means the process of performing the calculation on the execution model. That is, the resource holding unit 20 is the static expression of the data or the processing units on the execution model. Although the supervision processing is executed within the resource holding unit 20, such processing is not seen positively from the evaluating unit 21. The evaluating unit 21 provides the dynamic behavior of the resource holding unit 20 relative to the execution model and provides apparent changes in the resource holding unit 20. Such behavior or changes are obtained by hardware processing for evaluation.

Thus, in the present embodiment the resource holding unit 20 is used as means for holding the data or calculation units on the execution model as resources, whereas the evaluating unit 21 is used as means for executing the evaluation as the dynamic behavior or apparent changes of the resource holding unit 20 on the execution model.

In operation, the calculation units, such as processes or other tasks, are stored in the storage 20b of the resource holding unit 20. The resource manager 20a transmits the calculation units to the evaluation unit 21. In the evaluation unit 21, calculations are carried out in accordance with the instructions of the calculation units. When the evaluation unit 21 is in need of data stored in the resources holding unit 20, or requires storage of new data or calculation units in the resource holding unit 20, or requires communication with the outside, the evaluation unit 21 issues these demands to the resource manager unit 20a of the resource holding unit 20. The resource manager unit 20a then executes the necessary processing, that is, the resource manager 20a executes communication or processing of data stored in storage 20b and transmits the resultant data to the evaluation unit 21, which in turn executes calculations using the information from the resource holding unit 20. Meanwhile, the resource manager 20a also executes the virtual memory supervision or garbage collection.

In this manner, it is the resource manager 20a that executes the detailed procedure or processing of the communication or data processing on the resource holding unit 20, while the evaluation unit 21 is not even aware of such processing. Thus, overall processing on the system is more abstract and the descriptiveness on the system becomes higher than in the case where the process is executed corresponding to the process performed by the conventional evaluation unit 21. On the other hand, the evaluation unit 21 is available to perform any other calculation when the resource manager 20a is performing the processing for resources, as described above.

If during execution of a calculation in the evaluation unit 21, for example, it becomes necessary to determine whether the data base A and the data base B stored in the holding unit 20 are identical with each other, the evaluation unit 21 issues to the resource holding unit 20 instructions for determining whether the date base A and the data base B are identical with each other. The resource holding unit 20 compares the data base A and the data base B stored in the resource holding unit 20 and transmits the results of the data comparison to the evaluation unit 21. While the evaluation unit 20 is engaged in comparison between data base A and data base B, the evaluation unit 21 is available for executing any other processing.

Figure 10:
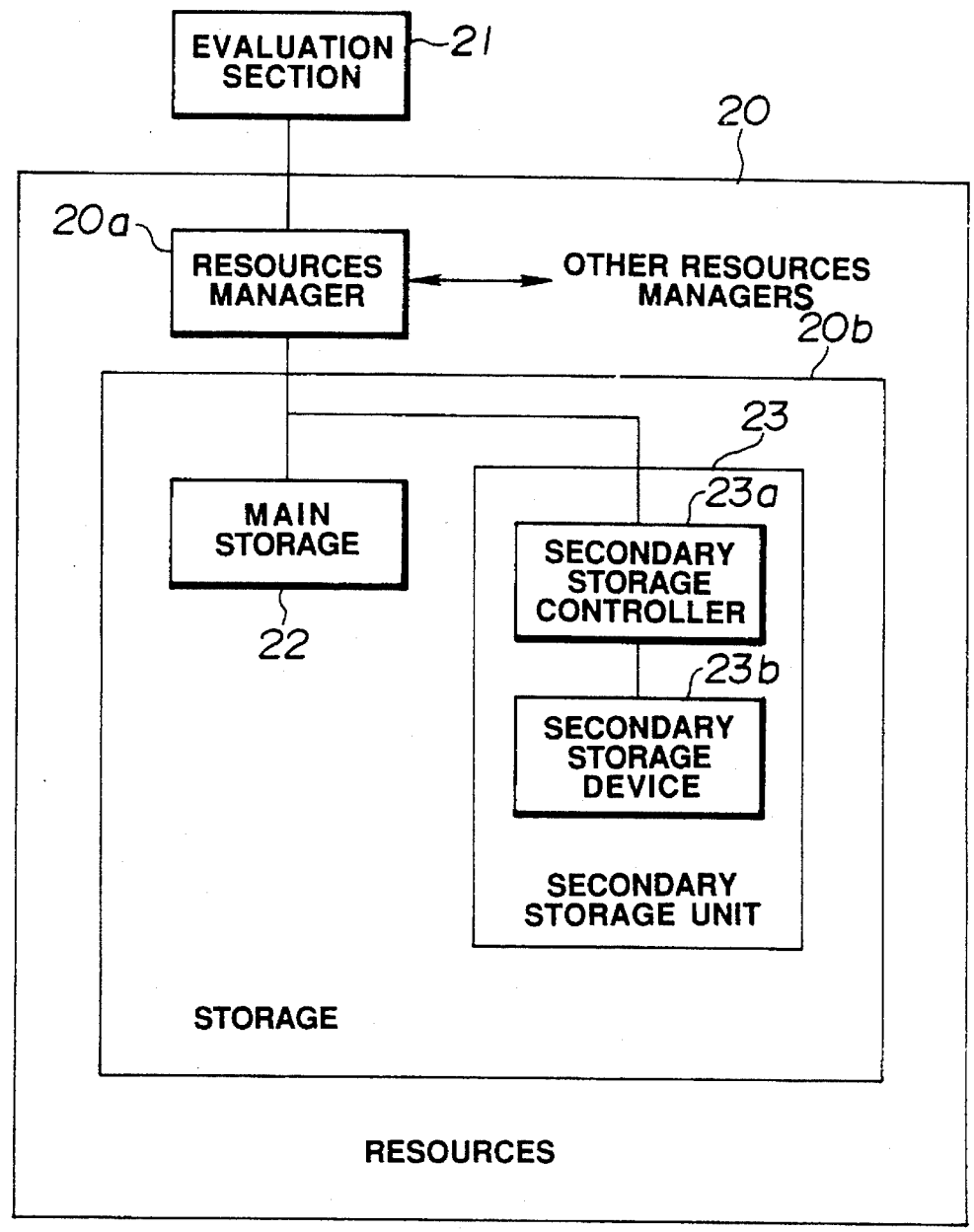
FIG. 10 shows a detailed construction of a storage unit in the system of FIG. 8.

FIG. 10 shows the storage 20b of the resource holding unit 20 implemented by employing a hierarchial memory device comprised of the main memory and the secondary memory employed in conventional electronic computers.

Referring to FIG. 10, the data recorded on a secondary storage device 23b, such as a magnetic disc, are transferred to and stored in the main memory 22 under control of a secondary memory controller 23a. The resource manager 20a generates the information necessitated by the evaluation unit 21 with the use of the stored data and transmits the information to the evaluation unit 21.

Figure 11:
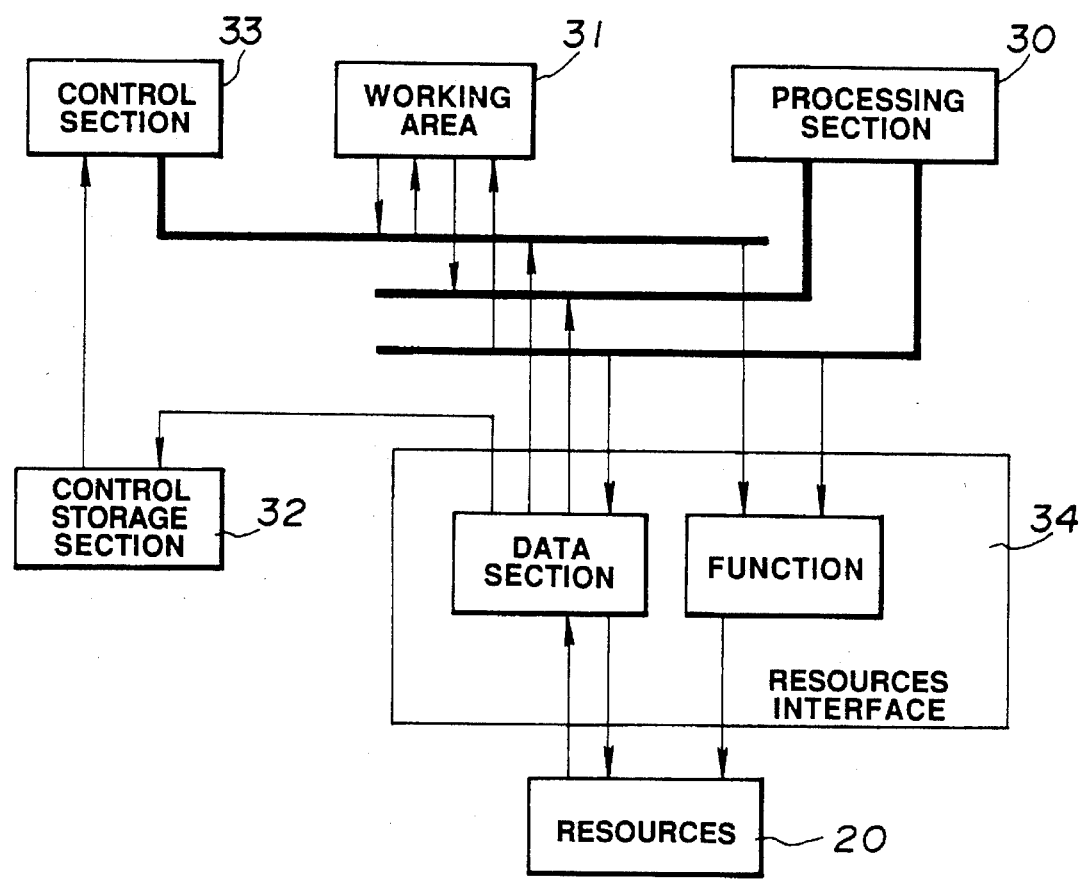
FIG. 11 shows a detailed construction of an evaluation unit in the system of FIG. 8.

FIG. 11 shows the detailed structure of the evaluation unit 21, in which a processing unit 30 executes data processing with the use of a working area 31. A control storage section 32 stores the method of evaluation read out from the resource holding section 20. A control section 33 controls the evaluation section 21 and a resources interface unit 34 on the basis of the method of evaluation stored in the control storage section 32. A data section 34a of the resource interface 34 performs a data exchange with the resource holding section 20 while giving instructions concerning the behavior of the resources holding section 20. Although the above-mentioned method of evaluation is stored as the program in the resource holding section 20, the basic portion or all of the method of evaluation may also be provided in the evaluation unit 21.

The construction of the resources manager 20a described above is substantially the same as that of the evaluation unit 21. That is, the resources manager 20a has the construction of the evaluation unit 21 to which is added an interface with other resources 20 and an interface with storage 20b.

According to the calculation model, such as a function-type or an object-oriented calculation model, or according to an execution model for implementing the upper level calculation model, the memory supervision, process supervision, task supervision or communication function, are the units of the calculation; the data and the calculation unit are the resources of the calculation; and the process of executing the calculation on the execution model is the evaluation. The resource holding unit 20 holding the resources and the evaluation section 21 are independent of each other to provide an architecture in which the calculation on an execution model is realized by evaluating the resources, and the information necessary for the evaluation is output in response to a demand from the evaluation unit 21. The evaluation unit 21 performs the evaluation of the resources as the dynamic behavior or apparent changes of the resources holding section 20 for improving the compatibility between the execution model and the hardware architecture.

On the other hand, a more abstract architecture than the conventional architecture may be obtained and an efficient program that is more conscious of the computer behavior may be formulated in the implementation of the execution model or in the programming description on the execution model. In addition, implementation of the execution model or a description of the execution model may be made on the basis of the hardware architecture.

Figure 12:
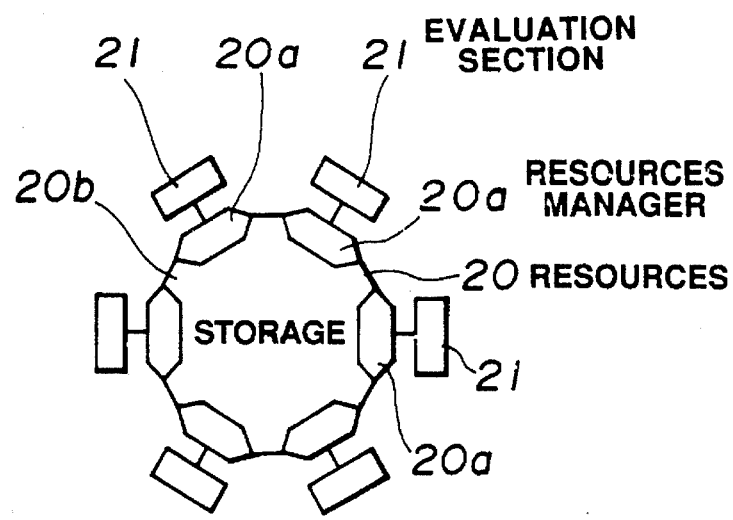
FIG. 12 shows the structure of a co-owned processing system.

The present invention is not limited to the above embodiment, for example, considering the linking between the resources 20 and the evaluator, the linking counterpart may be regarded as the resources 20. The linking of the resources holding unit 20, that is, the linking of the resources manager 20a, results in a parallel or distributed system. For example, a co-owned system, as shown for example in FIG. 12, may be implemented with the storage 20b co-owned by a number of resources managers 20A.

Figure 13:
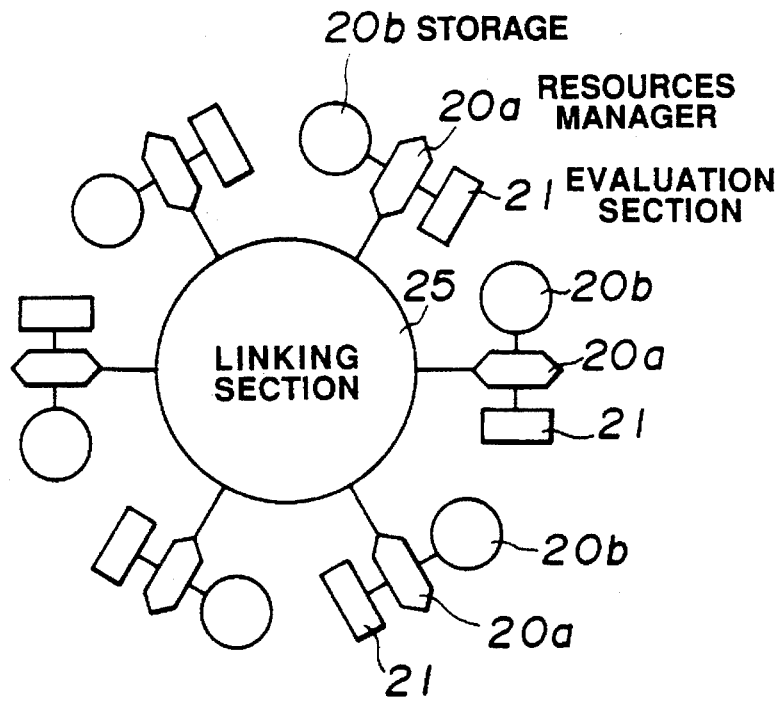
FIG. 13 shows the structure of a distributed processing system.

On the other hand, the distributed system shown in FIG. 13 may be implemented by interlinking a number of resources manager 20a by a linking section 25. Thus, the present invention facilitates constructing a high performance computer system, such as parallel or dispersed system.

It will be seen from above that, in accordance with the present invention, the compatibility between the execution model and the architecture may be improved by implementing evaluation of the resources on the architecture level, with the data, memory supervision, process supervision and the communication function as the so-called resources of calculation and with the process of execution of the calculation on the resources being the evaluation. Thus, the system description for implementing the execution model or the description of the execution model may be realized on the basis of the hardware architecture. The result is that a more abstract architecture than the conventional architecture may be obtained and a more efficient program may be formulated that is more conscious of the computer behavior. In addition, a computer system with a higher degree of functionality may be realized.

What is claimed is:

1. An information processing apparatus comprising:

holding means including storage means for storing resources including data and calculation units relating to an execution model of a program to be performed, memory supervision, or other system functions including device supervision, process supervision, task supervision, or communication functions, and processing means for controlling and managing the resources; and evaluating means for executing evaluations of the resources as a dynamic behavior of the resources stored within said holding means on the execution model, issuing commands to said holding means to acquire the data and the calculation units stored by said storage means, to initiate storage of new resources by said storage means, and to initiate communication with an external device, respectively, said processing means independently managing and controlling the calculation units in accordance with a command from said evaluating means such that said evaluating means becomes available to perform other processing upon commencement of processing of the command by said processing means and the processing by said processing means in response to the command is transparent to said evaluating means.

2. The information processing apparatus according to claim 1 wherein said processing means includes a microprogram system processor having overwritable memory means for microcode storage.

3. The information processing apparatus according to claim 2, wherein said microprogram system processor comprises:

setting means for designating a virtual memory space and corresponding mapping of said virtual memory space onto a real memory space in said overwritable memory means; and conversion table means for storing the mapping designated by said setting means, wherein a designation of any address in said virtual memory space accesses data, and the contents of said conversion table means may be dynamically modified by said setting means.

* * * * *